E. T. BOSTROM.
Cotton-Planter.
No. 20,694.  Patented June 29, 1858.
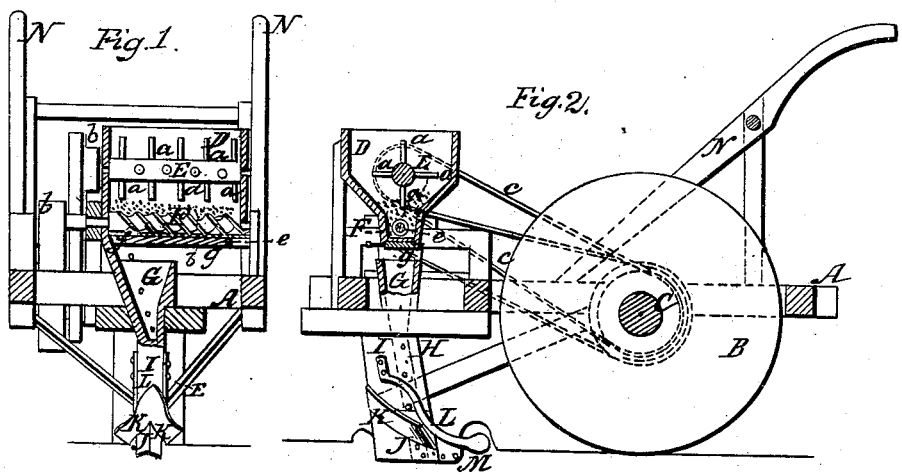
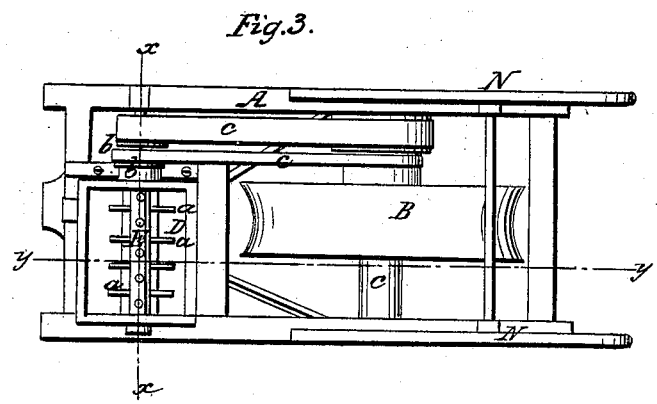

UNITED STATES PATENT OFFICE.

E. T. BOSTROM, OF NEWNAN, GEORGIA.

IMPROVEMENT IN COTTON-SEED PLANTERS.

Specification forming part of Letters Patent No. 20,694, dated June 29, 1858.

*To all whom it may concern:*

Be it known that I, EDWARD T. BOSTROM, of Newnan, in the county of Coweta and State of Georgia, have invented a new and Improved Cotton-Seed Planter; and I do hereby declare that the following is a full, clear, and exact description of the same, reference being had to the annexed drawings, making a part of this specification, in which—

Figure 1 is a transverse vertical section of my invention, taken in the line $x$ $x$, Fig. 3. Fig. 2 is a longitudinal vertical section of the same, taken in the line $y$ $y$, Fig. 1. Fig. 3 is a plan or top view of the same.

Similar letters of reference indicate corresponding parts in the several figures.

This invention consists in a novel distributing device, whereby a proper and uniform discharge of seed from the hopper is insured.

To enable those skilled in the art to fully understand and construct my invention, I will proceed to describe it.

A represents a horizontal rectangular frame, in which a wheel, B, is placed, the axle C of the wheel being fitted in proper bearings in the frame. The wheel B is at the back part of the frame, and its periphery is made of concave form, as shown clearly in Fig. 2.

On the front part of the frame A a seed-box, D, is placed, and in the upper part of the hopper a longitudinal shaft, E, is fitted, said shaft being provided with radial arms $a$. Underneath the shaft E, and near the bottom of the seed-box, a screw-shaft, F, is placed. Both shafts E F extend through the end of the box, and each has a pulley, $b$, placed on it, belt $c$ passing around said pulleys $d$ on the axle C of the wheel B. At one end of the bottom $e$ of the seed-box D an opening, $f$, is made, and a slide, $g$, is fitted underneath the bottom $e$, by adjusting, which the opening $f$ may be contracted if desired.

Directly below the seed-box D, and in line with the opening $f$, a tube, G, is placed, and this tube communicates with the upper part of an inclined tube, H, which is attached to the inner side of an inclined bar, I, secured to the under side of the front part of the frame A. The lower end of the bar I inclines toward the wheel B, as shown clearly in Fig. 2, and to the lower end of the bar I a furrow-share, J, is attached. This share is of double-mold-board form, so as to press the earth at each side, (see Fig. 1,) and the lower end of the tube H fits directly over the back part of the share.

To each side of the bar I a curved plate, K, is attached. These plates extend along the sides of the share J, the plates being so curved that the upper edges gradually spread outward. (See Figs. 1 and 2.)

To each side of the bar I there is also attached a curved bar, L. These bars pass down by the side of the bar I and tube H, and their lower ends are flattened, as shown at M, so as to form covering-blades. (See Fig. 2.) These blades M extend just back of the share J, one at each side of it.

N N are handles attached to the frame A and arranged in any proper way.

The operation is as follows: As the machine is drawn along the shafts E F are rotated by the belts $c$ $c$, and the seed in the box D is agitated and prevented from "arching" in the box by the arms $a$, and the screw F feeds or conveys the seed to the opening $f$. The seed passes down the tube G into the tube H and drops into the furrow made by the share J. The depth of this furrow is regulated by the plates K, which allow the share J to penetrate the earth a certain or requisite distance, said plates also serving as deflectors to throw off all weeds, sods, &c., which may lie in its path. The blades M throw the earth behind the share into the furrow, and consequently cover the seed. The plates K may be so arranged as to be adjustable, so that the depth of the furrows is regulated as desired. The wheel B serves to roll or press the earth on the seed, forming at the same time rounded ridges or drills, owing to its concave surface.

I do not claim separately any of the within parts irrespective of arrangement as herein shown; but,

Having thus described my invention, what I claim as new, and desire to secure by Letters Patent, is—

The combination of the screw F and shaft E, placed with the seed-box, D, and provided with beaters $a$, the whole being arranged to operate as and for the purpose set forth.

ED. T. BOSTROM.

Witnesses:
WM. F. ARNOLD,
H. R. HAMISEN.